(12) United States Patent
Nazzaro et al.

(10) Patent No.: US 10,463,125 B2
(45) Date of Patent: Nov. 5, 2019

(54) CO-MOLDED CERAMIC AND POLYMER STRUCTURE

(71) Applicant: Apple Inc., Cupertino, CA (US)

(72) Inventors: David I. Nazzaro, Groveland, MA (US); Joseph C. Poole, San Francisco, CA (US); Kevin M. Kenney, San Jose, CA (US); Naoto Matsuyuki, Kasugai (JP)

(73) Assignee: APPLE INC., Cupertino, CA (US)

(*) Notice: Subject to any disclaimer, the term of this patent is extended or adjusted under 35 U.S.C. 154(b) by 26 days.

(21) Appl. No.: 15/694,948

(22) Filed: Sep. 4, 2017

(65) Prior Publication Data

US 2017/0360167 A1  Dec. 21, 2017

Related U.S. Application Data

(63) Continuation of application No. 14/816,277, filed on Aug. 3, 2015, now Pat. No. 9,750,322.

(Continued)

(51) Int. Cl.
*B65D 41/28* (2006.01)
*A45C 11/00* (2006.01)
(Continued)

(52) U.S. Cl.
CPC ........ *A45C 11/00* (2013.01); *B29C 45/14311* (2013.01); *A45C 2011/002* (2013.01);
(Continued)

(58) Field of Classification Search
CPC .............. A45C 11/00; B29C 45/14311; B29C 2045/14327; B29C 2045/14868;
(Continued)

(56) References Cited

U.S. PATENT DOCUMENTS 4,756,852 A * 7/1988 Temus .................. G21F 5/00
                                                215/261
4,764,491 A   8/1988 Quadir
                (Continued)

FOREIGN PATENT DOCUMENTS

CN   1242685   1/2000
CN   2922311   7/2007
(Continued)

OTHER PUBLICATIONS

Siqueira et al., "Poly(borosiloxanes) as Precursors for Carbon Fiber Ceramic Matrix Composites," http://www.scielo.br/scielo.php?script=sci_arttext&pid=S1516-14392007000200009, Materials Research, vol. 10, No. 2, São Carlos, Apr./Jun. 2007.

*Primary Examiner* — Kareen K Thomas
(74) *Attorney, Agent, or Firm* — Dorsey & Whitney LLP

(57) ABSTRACT

A method of manufacturing a co-molded housing component for an electronic device is disclosed. A component formed from a ceramic material is placed in a mold. The mold comprises a first section defining a first cavity configured to receive the first component, and a second section defining a second cavity that is in communication with the first cavity when the mold is closed. The second cavity is in the shape of a feature that is to be joined to the ceramic material. A polymer material is injected into the second cavity, thereby forming the feature from the polymer material and bonding the feature to the ceramic material. The polymer material is cured. The first component and the feature together form the housing component for an electronic device.

22 Claims, 11 Drawing Sheets

Related U.S. Application Data

(60) Provisional application No. 62/129,868, filed on Mar. 8, 2015.

(51) Int. Cl.
  *B29C 45/14* (2006.01)
  *B29K 709/02* (2006.01)
  *B29K 101/12* (2006.01)
  *B29L 31/34* (2006.01)
  *B29K 101/10* (2006.01)

(52) U.S. Cl.
  CPC ............ *B29C 2045/14327* (2013.01); *B29C 2045/14868* (2013.01); *B29K 2101/10* (2013.01); *B29K 2101/12* (2013.01); *B29K 2709/02* (2013.01); *B29K 2995/0026* (2013.01); *B29L 2031/3481* (2013.01)

(58) Field of Classification Search
  CPC ............ B29K 2101/10; B29K 2101/12; B29K 2995/0026; B29K 2709/02; B29L 2031/3481
  USPC ............ 361/600–678, 679.01–679.09, 361/679.1–679.61, 688–837; 220/4.02
  See application file for complete search history.

(56) References Cited

U.S. PATENT DOCUMENTS

| | | | |
|---|---|---|---|
| 4,833,001 A | 5/1989 | Kijima et al. | |
| 4,857,093 A | 8/1989 | Prewo et al. | |
| 6,133,181 A | 10/2000 | Wentworth et al. | |
| 8,032,193 B2 * | 10/2011 | Xin | H04M 1/0247 379/330 |
| 8,076,011 B2 | 12/2011 | Chiang et al. | |
| 8,251,210 B2 | 8/2012 | Schmidt et al. | |
| 8,298,975 B2 | 10/2012 | Hasegawa et al. | |
| 8,322,560 B2 | 12/2012 | Jiang et al. | |
| 8,394,167 B2 | 3/2013 | Merkel et al. | |
| 8,442,604 B1 * | 5/2013 | Diebel | G03B 17/02 455/575.8 |
| 8,563,644 B2 | 10/2013 | Imada et al. | |
| 8,781,109 B2 | 7/2014 | Hong | |
| 9,007,747 B2 | 4/2015 | Gandhi | |
| 9,011,997 B2 | 4/2015 | Weber | |
| 9,448,713 B2 | 9/2016 | Cruz-Hernandez et al. | |
| 9,516,150 B2 | 12/2016 | Jeon et al. | |
| 9,750,322 B2 | 9/2017 | Nazzaro et al. | |
| 2009/0197048 A1 | 8/2009 | Amin et al. | |
| 2010/0003479 A1 | 1/2010 | Hwang et al. | |
| 2010/0104789 A1 * | 4/2010 | Imada | B32B 25/14 428/36.8 |
| 2010/0302716 A1 * | 12/2010 | Gandhi | G06F 1/1624 361/679.01 |
| 2011/0049139 A1 * | 3/2011 | Jiang | G06F 1/1626 220/4.01 |
| 2012/0032876 A1 * | 2/2012 | Tabe | H04B 1/3838 345/156 |
| 2012/0034954 A1 * | 2/2012 | Tabe | H04M 1/0202 455/566 |
| 2012/0168336 A1 * | 7/2012 | Schmidt | H04M 1/04 206/478 |
| 2013/0108813 A1 | 5/2013 | Zhu | |
| 2013/0146491 A1 * | 6/2013 | Ghali | G06F 1/1626 206/320 |
| 2013/0224454 A1 | 8/2013 | Jung et al. | |
| 2013/0257240 A1 * | 10/2013 | Hong | H04B 1/3888 312/223.1 |
| 2013/0316116 A1 | 11/2013 | Adams et al. | |
| 2014/0178642 A1 | 6/2014 | Milanovska et al. | |
| 2015/0010721 A1 | 1/2015 | Tanida et al. | |
| 2015/0194994 A1 * | 7/2015 | Soriano | H04B 1/3888 455/575.8 |
| 2015/0246459 A1 | 9/2015 | Dorn et al. | |
| 2016/0089811 A1 | 3/2016 | Matsuyuki et al. | |
| 2016/0090326 A1 | 3/2016 | Matsuyuki et al. | |
| 2016/0347674 A1 | 12/2016 | Meschke et al. | |
| 2017/0075039 A1 | 3/2017 | Hart et al. | |
| 2017/0088473 A1 | 3/2017 | Wilson et al. | |
| 2017/0300114 A1 | 10/2017 | Matsuyuki et al. | |
| 2018/0063975 A1 | 3/2018 | Ely et al. | |
| 2018/0070463 A1 | 3/2018 | Ely et al. | |
| 2018/0079686 A1 | 3/2018 | Matsuyuki et al. | |

FOREIGN PATENT DOCUMENTS

| | | |
|---|---|---|
| CN | 201248054 | 5/2009 |
| CN | 102256457 | 11/2011 |
| CN | 104253884 | 12/2014 |
| CN | 105622096 | 6/2016 |
| EP | 0826645 | 3/1998 |
| EP | 1857428 | 11/2007 |
| EP | 2243756 | 10/2010 |
| EP | 2266934 | 12/2010 |
| TW | M300407 | 11/2006 |
| TW | 200909174 | 3/2009 |
| WO | WO 16/043378 | 3/2016 |

* cited by examiner

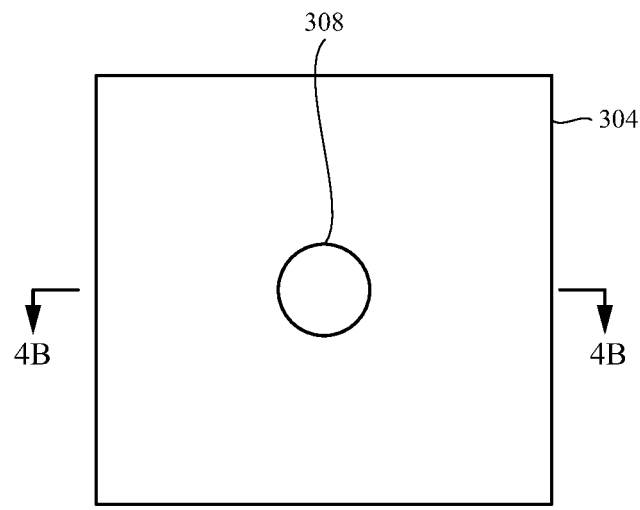
*FIG. 4A*
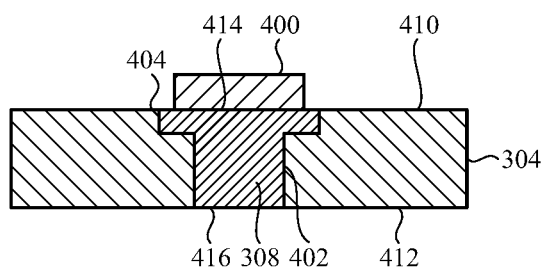 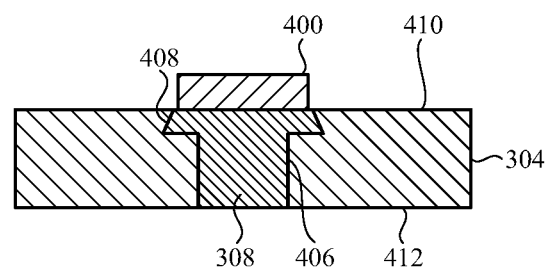
*FIG. 4B*          *FIG. 4C*

CO-MOLDED CERAMIC AND POLYMER STRUCTURE

CROSS-REFERENCE TO RELATED APPLICATIONS

This application is a continuation of U.S. patent application Ser. No. 14/816,277, filed Aug. 3, 2015, and titled "Co-Molded Ceramic and Polymer Structure," which is a nonprovisional patent application of and claims the benefit of U.S. Provisional Patent Application No. 62/129,868, filed Mar. 8, 2015, and titled "Co-Molded Ceramic and Polymer Structure," the disclosures of which are hereby incorporated herein by reference in their entirety.

FIELD

The disclosure relates generally to ceramic and polymer structures, and more particularly to a co-molded ceramic and polymer structure for electronic devices.

BACKGROUND

Electronic devices often include housings that enclose some or all of the sensitive and/or delicate components of the electronic device. Such housings may have multiple mating parts that are clipped, glued, bonded, or otherwise affixed to one another to form the housing and to enclose electronic components within the housing.

Traditionally, plastic has been used for electronic device housings, at least in part because it is easy to form into the complex shapes and geometries required for modern electronic devices. Increasingly, however, housings for electronic devices are being made from materials other than plastic. For example, housings that include glass, ceramics, and the like are being used for their superior strength, optical properties, and aesthetic properties. However, such materials present drawbacks of their own. For example, small retaining features for coupling housing components together (e.g., clips, arms, detents, grooves) may be relatively simple to mold into a plastic piece, but may be difficult or impossible to form out of glasses and ceramics.

SUMMARY

Embodiments discussed herein are related to products with ceramic materials co-molded with polymer materials, as well as methods of manufacturing housings and/or housing components by co-molding ceramic materials with polymer materials.

In some embodiments, a method for manufacturing a housing component for an electronic device includes placing a first component formed from a ceramic material in a mold. The mold may include a first section defining a first cavity configured to receive the first component, and a second section defining a second cavity that is in communication with the first cavity when the mold is closed, and is in the shape of a feature that is to be joined to the ceramic material. A polymer material may be injected into the second cavity, thereby forming the feature from the polymer material and bonding the feature to the ceramic material. The polymer material may be cured. The first component and the feature together form the housing component for an electronic device.

In some embodiments, a method of manufacturing a housing component for an electronic device includes securing a ceramic component in a fixture. The ceramic component may have a first side and a second side opposite to the first side, and may define an aperture extending from the first side to the second side therein. A polymer material may be injected into the aperture such that the polymer material substantially fills the aperture, and such that a first surface of the polymer material is substantially coplanar with the first side of the ceramic component. The polymer material may be cured.

In some embodiments, a housing component for an electronic device includes a ceramic shell, the ceramic shell having a central surface surrounded by a flange extending away from the central surface, the central surface and the flange defining a cavity. The housing component may include a polymer material coating the central surface and the flange. The polymer material may be bonded to the central surface and to the flange without any adhesive between the polymer material and the ceramic shell.

In some embodiments, a housing for an electronic device includes a first housing component. The first housing component may include a first housing portion formed from a ceramic material, and a retaining component coupled to a surface of the first housing portion. The retaining component may include an arm extending away from the first housing portion and may be configured to engage with a retaining feature of a second housing component to retain the first housing component with the second housing component. The retaining component may be formed from a polymer material.

In some embodiments, a housing for an electronic device includes a first housing component. The first housing component may include a first housing portion formed from a ceramic material, and a retaining component coupled to a surface of the first housing portion. The retaining component may include an arm extending away from the first housing portion. The retaining component may be formed from a polymer material. The housing further includes a second housing component including a retaining feature. The arm of the retaining component may be engaged with the retaining feature, thereby retaining the first housing component with the second housing component. The first housing component and the second housing component define an interior volume that is configured to receive electronic device components.

Other embodiments are disclosed herein. The features, utilities and advantages of various embodiments of this disclosure will be apparent from the following description of embodiments as illustrated in the accompanying drawings.

BRIEF DESCRIPTION OF THE DRAWINGS

The disclosure will be readily understood by the following detailed description in conjunction with the accompanying drawings, wherein like reference numerals designate like structural elements, and in which:

FIG. 4A depicts a bottom plan view of the housing of FIG. 3, in accordance with some embodiments;

FIGS. 4B-4C depict cross-sectional views of a first portion of the housing of FIG. 4A, in accordance with some embodiments;

DETAILED DESCRIPTION

Figure 1:
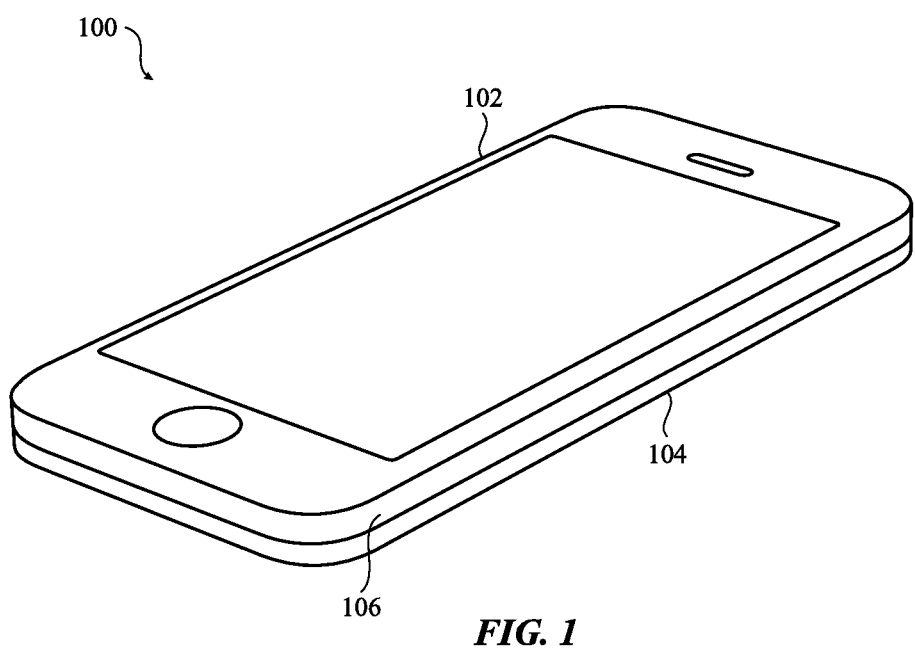
FIG. 1 depicts an illustrative perspective view of an example of an electronic device, in accordance with some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Housings for electronic devices are increasingly made with materials other than just plastic. For example, housings may include portions that are made from ceramic, crystal, glass, metal materials, or the like. As a specific example, a housing for a watch may include a crystal element serving as a cover for a display screen or watch face of the watch, and a ceramic portion covering the back of the watch (e.g., the portion of the watch that sits against a user's skin when being worn on the user's wrist). Similarly, a housing for a smartphone or tablet computer (or other electronic device) may include a glass or crystal element serving as a cover for a display screen, and a metal, ceramic, or other material serving as a back portion of the device.

Such materials can be difficult to form into the complex geometries necessary for electronic device housings. For example, a housing may consist of multiple discrete parts that are coupled together to create the housing. In order to provide a secure connection between components, as well as to provide adequate sealing for the components of the electronic device, the housing components may include mating features, surfaces, clips, shoulders, or other complex geometries or features that facilitate adequate mating, coupling, and/or sealing of the housing components. For some materials, these complex geometries are difficult or impossible to form from the material. Further, even if a desired geometry can be achieved with a particular material, it may be expensive to do so, or may result in components that are too weak to be used in a consumer electronic device.

As one specific example, ceramic materials have numerous qualities that make them particularly useful for use in electronic device housings. For example, they may be highly scratch resistant, making them particularly well suited for electronic devices that are frequently subject to bumps, scrapes, and scratches, such as wearable electronic devices (e.g., smart watches, glasses and the like), mechanical watches, and other consumer products (including, but not limited to, media players, mobile computers, tablet computing devices, and so on). As a specific example, the high hardness and optical clarity of sapphire crystal (a crystalline ceramic material) may be very well suited as the cover glass for a touch-screen of a wearable electronic device. Ceramic materials may also be relatively light, making handheld or wearable electronic devices easier to carry, wear, and use. Moreover, ceramic materials may be able to achieve a high degree of surface polish making them particularly aesthetically pleasing.

However, ceramic materials typically are more difficult to form into complex geometries than plastics, and, thus, manufacturing housing components from ceramic materials can be more difficult than for other materials. Accordingly, described herein are housing components where a polymer material is co-molded with a ceramic component to form a housing component that includes ceramic and polymer material portions. (As used herein, the terms "polymer" and/or "polymer material" encompass natural and synthetic polymers, plastics, rubbers, and the like.) For example, a ceramic housing portion may be co-molded with a polymer material to form a polymer clip that is directly coupled to the ceramic material and can be used to retain the ceramic component with another housing component. As another example, a polymer material may be co-molded with a ceramic component to form a plastic coating on a portion of the ceramic component As described herein, a polymer material forming a polymer feature may be coupled to a ceramic component by a co-molding process whereby the polymer material is molded against the ceramic component. By co-molding the polymer material directly onto the ceramic component, the polymer feature may be bonded to the ceramic material without the use of an intervening adhesive or other bonding agent between the ceramic and the polymer feature. For example, instead of separately forming the ceramic component and the polymer feature, and then adhering the polymer feature to the ceramic with glue, pressure sensitive adhesive, heat activated films, epoxy, or the like, the polymer may be molded directly against the ceramic material. Thus, parts that include both ceramic and polymer components can be manufactured more quickly and with higher precision than would be achieved if the components had to be manufactured separately and thereafter coupled together with adhesive. In some embodiments, the polymer material is injection molded onto the ceramic component. In some embodiments, the polymer material is molded onto the ceramic component using techniques other than injection molding, such as gravity casting, or any other appropriate co-molding process. Where the present discussion refers to injection molding, it will be understood that other molding techniques may be used in such instances instead of or in addition to injection molding.

The polymer may bond to the ceramic material as a result of the co-molding process in any appropriate manner and/or using any appropriate mechanism. In some cases, the ceramic material to which the polymer material is molded has a surface finish that is adapted to facilitate the bonding between the polymer and the ceramic. For example, the ceramic material may be polished so as to provide a smooth surface for the polymer material to bond to.

As another example, the ceramic material may have a rough surface. In some embodiments, a rougher (e.g., ground or unpolished) surface increases the strength of the bond between the polymer material and the ceramic material, as the polymer material can flow into the imperfections, cracks, grooves, or other surface irregularities or discontinuities. In some embodiments, the ceramic material is treated prior to the co-molding process to produce a desired surface finish or surface roughness. For example, the surface of the ceramic material that is to be co-molded with a polymer material may be sanded, sand blasted, ground, or etched (chemically, mechanically, or otherwise). In some embodiments, however, the manufacturing process used to form the ceramic material naturally results in a suitably rough surface, obviating the need for extra processing steps to prepare the surface for desired adhesion, and further increasing manufacturing efficiency.

Moreover, the flowing of polymer material into imperfections and/or irregularities in the ceramic component (e.g., microcracks, discontinuities, or the like) may increase the overall strength of the ceramic and polymer part. In particular, the polymer material may reduce the stress concentrations that occur at or near such features, thus reducing the likelihood that the ceramic material will crack, shatter, or otherwise break under stress.

In some embodiments, in addition to or instead of the micro-scale features described above, the ceramic material includes one or more macro-scale features that interact with the polymer material in order to secure the polymer material to the ceramic material. For example, a ceramic component may include one or more channels, holes, grooves, indentations, or any other appropriate void into which polymer material may be flowed during molding in order to secure the polymer and the ceramic materials together. As a specific example, the ceramic component may include one or more blind holes on a surface that is to be coupled to a polymer component. When the ceramic component is inside a mold cavity, and a polymer material is injected into the mold, the polymer material may flow into the one or more blind holes, thus mechanically coupling the polymer material (and the resulting polymer feature) to the ceramic component. In some embodiments, the channels, holes, grooves (or other surface features), in the ceramic component have complex internal geometries (such as undercuts) that further increase the mechanical engagement between the polymer and the ceramic materials, and therefore increase the strength and/or durability of the coupling therebetween.

As another example, the ceramic component may include one or more protrusions (e.g., posts, arms, pegs, bumps, and the like) around which the polymer material is molded in order to increase the strength and/or durability of the coupling between the polymer and ceramic materials. For example, a ceramic component may include a peg (e.g., a cylindrical protrusion) extending outward from a surface, and the polymer material, when molded against the ceramic component, will surround the peg, thus interlocking the polymer and ceramic components.

In addition to the increased speed and precision of manufacturing that is made possible by co-molding polymer and ceramic components, it may be possible to produce ceramic parts with geometries and/or features that would not be possible (or would be expensive or complicated to manufacture) with ceramic alone. For example, it may be desirable to use a ceramic material for a housing component for an electronic device, as described herein, but housing components may require complex geometries for mating, alignment, and/or retaining features. More specifically, a back portion of a smartphone may be a largely planar component, but may have complex structures around the periphery to facilitate a suitable coupling and sealing with a front portion of the smartphone. Such structures may include pins, holes, retaining arms, shoulders, flanges, and the like. If the back is desired to be formed from a ceramic material, it may be difficult, expensive, or even impossible to form such geometries (or they may render the component too weak for its intended use). Polymer materials, on the other hand, are particularly well suited to being formed into complex geometries, as they can easily be molded using injection molding or other well-known forming techniques. Accordingly, by forming the complex features by co-molding a polymer material directly onto a ceramic component, it is possible to take advantage of the beneficial properties of each material (e.g., the hardness and aesthetic appeal of ceramic, and the flexibility and ease of manufacturing of polymer material).

Moreover, because the ceramic material can be a relatively simple shape, it can be manufactured more cheaply and quickly than would otherwise be the case. As a specific example, the ceramic portion of a ceramic and polymer housing component may have a flat, planar surface to which the complex polymer material may be molded. Accordingly, the manufacturing complexity the ceramic portion can be minimized, resulting in significant efficiency and cost gains. Indeed, in some cases, the ceramic portion may be essentially a rectangular prism.

While the present discussion generally describes that the polymer features may be used for mounting and/or retaining housing components, these are merely some examples of features that may be formed from polymer material and co-molded with a ceramic material. Indeed, the methods described herein are suited for forming many different features for many different purposes, such as standoffs, compartments (e.g., in which electronic components may be mounted and/or secured), decorative features/inlays, coatings/coverings, and the like.

Moreover, co-molding a polymer and a ceramic material as described herein may result in a component that is stronger and/or tougher than a similar component manufactured entirely out of ceramic. In particular, ceramic materials are often very strong, but they tend to be brittle and they tend to deform or deflect very little prior to fracturing when a load is applied. That is, the ceramic material tends to break rather than elongate when a force of sufficient magnitude is applied. Certain polymer materials may be stiffer than the ceramic materials, however, such as high-modulus carbon fiber reinforced polymers. When a component is produced by co-molding a high-modulus polymer material onto a ceramic material, the high-modulus polymer material may limit the overall deformation of the component when the component is subjected to a loading. By limiting the deformation of the ceramic material with the polymer material, the component will be able to withstand greater forces than would be possible with ceramic alone.

Various additional benefits, structures, differences, and/or features of the co-molded ceramic and polymer components described herein will be apparent from the attached Figures and corresponding description. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Referring now to FIG. 1, there is shown an illustrative perspective view of one example of an electronic device 100 (also referred to as "device 100"). In particular, the device 100 represents a smartphone. However, this is merely one example of an electronic device, and the device 100 may be any appropriate electronic device, including a watch, a laptop computer, a wearable electronic device, a health monitoring device, a biometric sensor, a calculator, an audio/video player or recorder, and so on.

In some embodiments, the device 100 may be an electronic device configured to provide health-related information or data including but not limited to heart rate data, blood pressure data, temperature data, oxygen level data, diet/nutrition information, medical reminders, health-related tips or information, or other health-related data.

The device 100 may include a housing 102. The housing 102 may form an outer surface or partial outer surface and protective case for the internal components of the device 100. The housing 102 may include a first housing portion 104 and a second housing portion 106. In some embodiments, the first housing portion 104 forms a bottom portion of the housing, and the second housing portion 106 forms a top portion of the housing. The first and second housing portions 104, 106 may be coupled together to form the housing 102, as described herein. While FIG. 1 depicts a housing formed of two components (e.g., a top shell and a bottom shell), this is merely one example of possible housing configurations. A housing may include more or fewer housing components, and may include different configurations and/or shapes of housing components to constitute the housing.

In some embodiments, at least the first housing portion 104 is formed from a ceramic material. In some embodiments, the first housing portion 104 is a unitary piece of ceramic material. Ceramic materials include, but are not limited to, porcelain, alumina, beryllia, ceria, zirconia, carbide, boride, nitride, silicide, particulate reinforced ceramics, fiber reinforced ceramics, combinations of oxides and nonoxides, and ceramic-metal composites (cermet). In some embodiments, the second housing portion 106 is formed from any material, including polymer, metal, glass, ceramic, and the like. In the present description, a housing portion formed from a ceramic material is also referred to as a ceramic housing portion or a ceramic component.

Figure 2A:
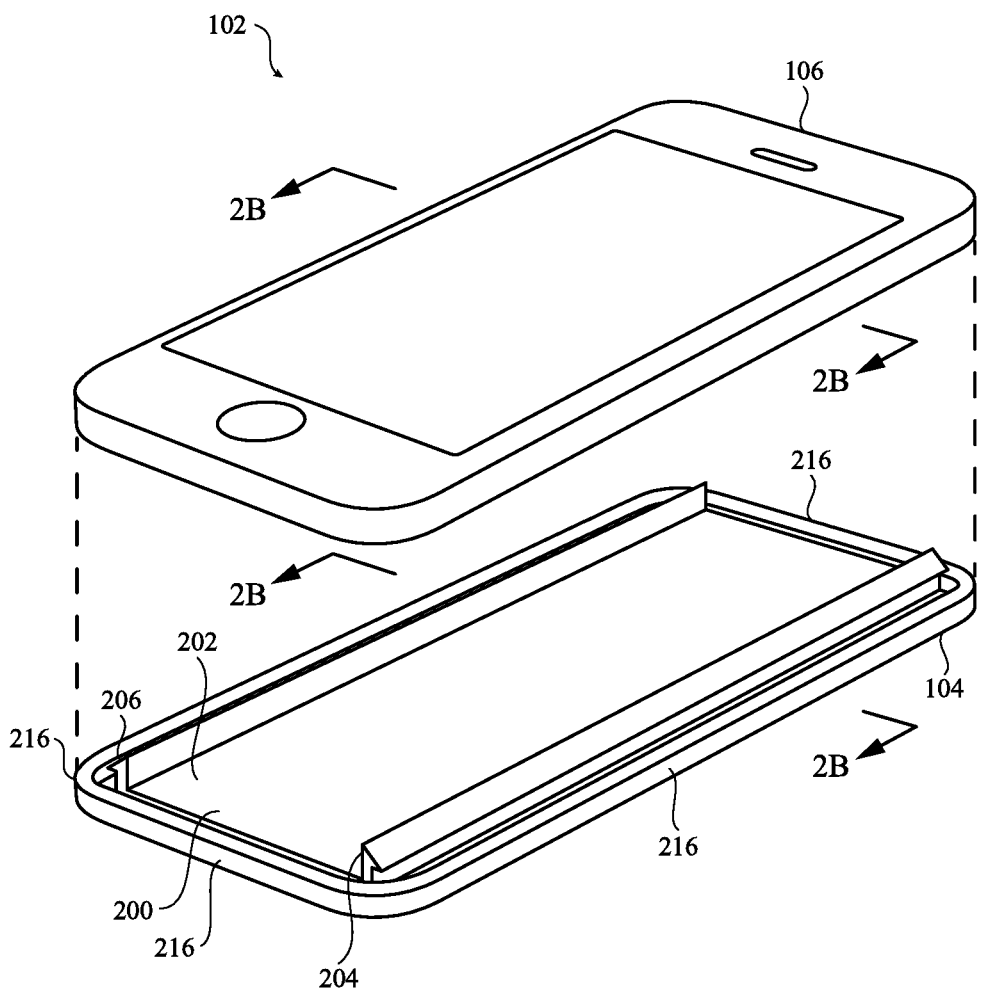
FIG. 2A depicts an exploded perspective view of a housing for an electronic device, in accordance with some embodiments.

FIG. 2A depicts an exploded perspective view of the housing for an electronic device, showing the second portion 106 separated from the first housing portion 104. In some embodiments, the first housing portion 104 is a shell forming a cavity. The cavity may be defined by a first surface of the ceramic shell (e.g., under a mounting base 202 of the retaining component 200) and one or more flanges or walls (e.g., walls 216) at an outer periphery of the first surface. The one or more flanges extend away from the first surface in a first direction in order to define the cavity. In some embodiments, the cavity defines a portion of an interior volume of the housing 102 into which electronic device components are situated. The shell forming the cavity is merely one example of a portion of a housing for an electronic device, and other shapes and configurations of a housing portion are also contemplated. For example, FIGS. 6A-9A illustrate additional configurations that may correspond to portions of housings for electronic devices.

In some embodiments, the first housing portion 104 includes a polymer material coupled thereto. As shown in FIG. 2A, the polymer material shown is a retaining component 200. However, this is merely one example of a polymer feature that may be coupled to the first housing portion 104. For example, the polymer material may be a polymer coating or layer that is applied to a surface of the first housing portion 104 (e.g., as shown and described with respect to FIGS. 6A-7B), a polymer window molded into an opening in the first housing portion 104 (e.g., as shown and described with respect to FIGS. 3-4C), a polymer protrusion extending away from the first housing portion 104 (e.g., as shown and described with respect to FIGS. 8A-8B), or the like.

As described herein, the polymer material (e.g., the retaining component 200) is coupled to the first housing portion 104 as a result of the polymer material being co-molded directly onto the first housing portion 104. More particularly, instead of separately forming the first housing portion 104 and the retaining component 200, and then adhering the retaining component 200 to the first housing portion 104 with glue, pressure sensitive adhesive, heat activated films, epoxy, or the like, the polymer may be molded directly against the ceramic material.

As noted above, the polymer material may be coupled to the first housing portion 104 by a mechanical bond between the polymer material and the ceramic material. The mechanical bond may result from microscopic or macroscopic mechanical engagement between the materials. For example, the mechanical bond may result from a liquid polymer interacting with the first housing portion 104 by flowing into and/or around microstructures (e.g., microscopic grooves, surface irregularities, and the like) in the first housing portion 104. (A liquid polymer includes polymers that are heated in order to cause the polymer to flow, such as thermoplastic polymers, or polymers that are in a liquid state without the addition of any heat, such as thermoset polymer.)

The mechanical bond may also or instead result from liquid polymer interacting with the first housing portion by flowing into and/or around macrostructures (e.g., undercuts, channels, holes, posts, detents, and the like) of the first housing portion. Microstructures and macrostructures may be manually created (e.g., with mechanical or chemical etching, sandblasting, laser etching or ablation, or the like), or may be naturally occurring (e.g., microcracks, dislocations, and/or surface irregularities resulting from the normal manufacturing or formation of the material). Whether based on microscopic or macroscopic mechanical structures, the polymer material and the ceramic material may form one or more interlocking structures (e.g., undercuts or geometries including undercuts) that engage with one another to couple the polymer material to the ceramic material.

In some embodiments, the polymer material may include an adhesive that creates or increases a bond between the polymer material and the ceramic material. The adhesive may be included in the liquid polymer material such that the process of molding the polymer material against the ceramic material facilitates the adhesive bond. Accordingly, an adhesive need not be introduced between the ceramic material and the polymer material in order for the polymer material to be bonded to the ceramic material. Rather, the polymer material bonds directly to the ceramic material, with the aid of the adhesive, without any interstitial component (e.g., glue, pressure sensitive adhesive, and the like). In some embodiments, the adhesive is homogenized with the liquid polymer material.

In some embodiments, the polymer material is a thermoplastic polymer material, such as polyamide, polypropylene, polystyrene, polymethyl methacrylate, polyethylene, or the like. In some embodiments, the polymer material is a thermoset polymer material, such as epoxy, polyester, vinyl ester, phenolic, or the like. In some embodiments, the polymer material includes reinforcing fibers, such as carbon fibers, glass fibers, ceramic fibers, carbon nanotubes, aramid fibers, and the like.

Returning to FIG. 2A, the retaining component 200 includes a mounting base 202, as well as a first arm 204 and a second arm 206 each extending away from the mounting base 202. The first and second arms 204, 206 are connected, via the mounting base 202, to an outer periphery of the first housing portion 104.

The first and second arms 204, 206 are configured to engage with a retaining feature of the second housing portion 106 in order to retain the first housing portion 104 to the second housing portion 106. In some embodiments, as shown in FIG. 2A, the first and second arms 204, 206 may be elongate members that extend along substantially all of a length of the first housing portion 104. In some embodiments, the first and second arms 204, 206 extend along more than half of the length of the first housing portion 104.

Figure 2B:
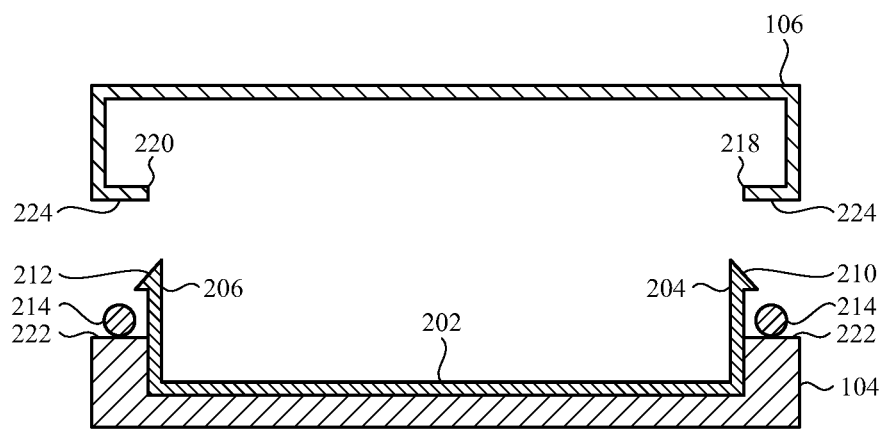
FIGS. 2B-2C depict cross-sectional views of the housing of FIG. 2A, in accordance with some embodiments.
Figure 2C:
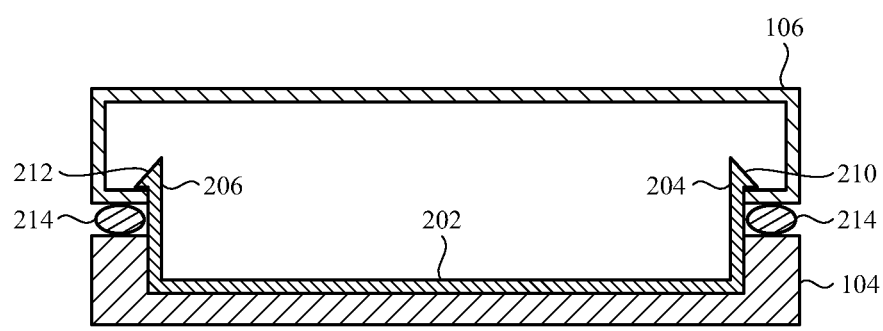

FIGS. 2B and 2C depict cross-sectional views of the housing 102 taken through line 2B-2B in FIG. 2A. In particular, FIG. 2B shows the first housing portion 104 separated from the second housing portion 106, and FIG. 2C shows an assembled housing where the first housing portion 104 is retained with the second housing portion 106. When the first housing portion 104 is retained with the second housing portion 106, the first housing portion 104 may be held in a fixed relationship to the second housing portion 106.

As shown in FIG. 2B, the first and second arms 204, 206 of the retaining component 200 extend away from the mounting base 202. The first and second arms 204, 206 include first and second latch elements 210, 212, respectively. The latch elements are configured to engage with retaining features 218, 220, respectively, of the second housing portion 106 in order to retain the first and second housing portions 104, 106 together.

In some embodiments, the housing 102 includes a seal 214 disposed between a sealing face 222 of the first housing portion 104 and a sealing face 224 of the second housing portion 106. The sealing faces of the first and second housing portions may face one another such that they both make contact with the seal 214 when the housing portions are assembled together to form the housing 102. The seal 214 may be formed from any appropriate sealing material, such as an elastomer, foam, or the like.

In some embodiments, the seal 214 seals a gap between the first and second housing portions. The seal 214 may serve to prevent or limit debris, moisture, air, or other material from entering and/or escaping the interior of the housing.

In some embodiments, the seal 214 may be compressed between the first and second housing portions 104, 106 such that the seal 214 imparts a force that tends to separate the housing portions. This separation force in turn exerts a locking or latching force between the latch elements 210, 212 of the retaining component 200 and the retaining features 218, 220 of the second housing portion 106.

The seal 214 may be a single, unitary component (e.g., a unitary piece of sealing material, such as a rubber O-ring or continuous sealing material applied and/or bonded to a sealing face of a housing portion). Alternatively, the seal 214 may be formed from multiple discrete components, such as individual strips of foam, elastomer, a polymer, or other sealing material disposed between the housing portions.

In some embodiments, the seal 214 is coupled to one or both of the first and second housing portions 104, 106. For example, the seal 214 may be coupled to a sealing face 222 of the first housing portion 104 with an adhesive (e.g., glue, pressure sensitive adhesive, and the like).

As described herein, the polymer material (e.g., the retaining component 200) may be coupled to the first housing portion 104 by a co-molding process whereby the polymer material is molded against the first housing portion 104 (e.g., using injection molding, gravity casting, or the like). For example, as described herein, the first housing portion 104 (formed from a ceramic material) may be introduced into a mold that has a first cavity configured to receive the first housing portion 104 (or a portion thereof), and a second cavity configured in the shape of a feature to be coupled to the first housing portion 104. In the case of the housing 102, the second cavity corresponds to the retaining component 200, though other features and shapes are also contemplated.

Due to difficulty in forming complex geometries from ceramic materials, as well as the rigidity and brittleness of some ceramic materials, it may be difficult or impossible to form a unitary part that includes both the first housing portion 104 and the retaining component 200. For example, if the arms 204 and 206 were manufactured from ceramic material, they may be too inflexible to couple the first housing portion 104 to the second housing portion 106. Specifically, when the first and second housing portions are coupled together, polymer arms 204, 206 may deflect when the latch elements 210, 212 slide over the retaining features 218, 220. If the arms were formed from a ceramic material, the arms may be too brittle to deflect when the latch elements 210, 212 slide over the retaining features 218, 220, and the latch elements 210, 212 or arms 204, 206 may simply break.

In FIGS. 1-2C, the polymer feature is configured to be internal to the housing. This need not be the case, however. In particular, the benefits of co-molding a polymer material with a ceramic material may also be useful for polymer features that are external to a housing (or otherwise external to a device). For example, a smartwatch (such as that shown and described with reference to FIG. 3) may include watch straps coupled to the housing via one or more strap attachment structures. While the watch housing may be formed (at least in part) from ceramic material, it may be beneficial to form the strap attachment structures from a polymer material. For example, it may be easier to form the complex geometry of the strap attachment structures from polymer than it would be from ceramic, or, in some embodiments, the ceramic material may be too brittle for use as a strap attachment structure. Accordingly, the strap attachment structures may be formed by co-molding a polymer material onto the ceramic material of the housing in the same way that the retaining component 200 is co-molded onto the first housing portion 104.

Figure 3:
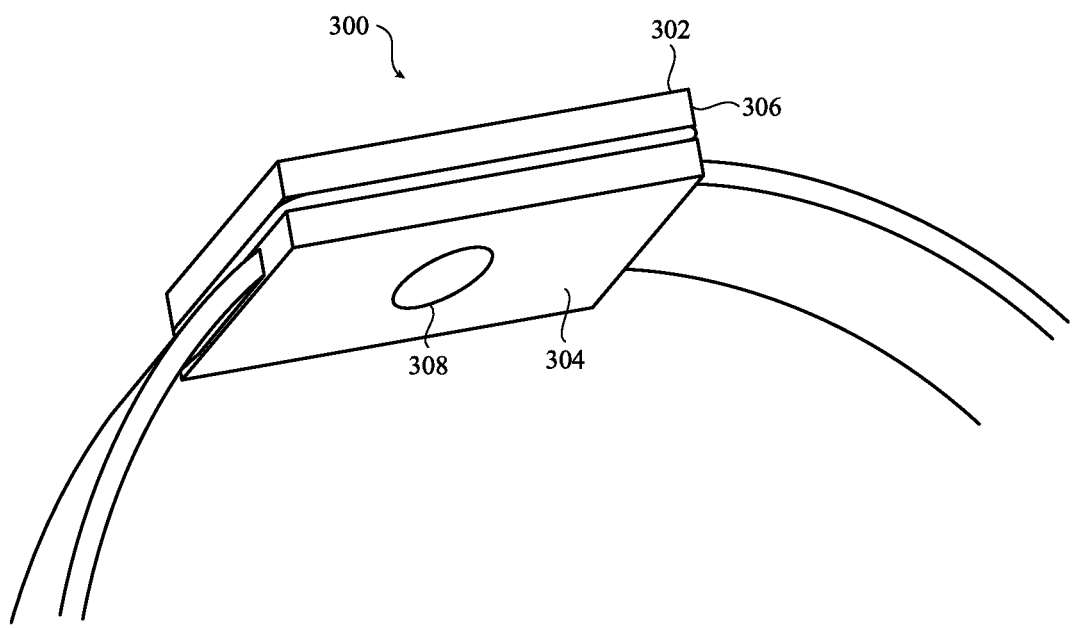
FIG. 3 depicts an illustrative perspective view of an example of an electronic device, in accordance with some embodiments.

Referring now to FIG. 3, there is shown an illustrative perspective view of one example of an electronic device 300 (also referred to as "device 300"). In particular, the device 300 represents a watch, such as a smartwatch. However, this is merely one example of an electronic device, and the device 300 may be any appropriate electronic device, including a smartphone, a laptop computer, a wearable electronic device, a health monitoring device, a biometric sensor, a calculator, an audio/video player or recorder, and the like.

The device 300 may include a housing 302, similar to the housing 102 described above. The housing 302 may form an outer surface or partial outer surface and protective case for the internal components of the device 300. The housing 302 may include a first housing portion 304 and a second housing portion 306. In some embodiments, the first housing portion 304 forms a bottom portion of the housing, and the second housing portion 306 forms a top portion of the housing. The first and second housing portions 304, 306 may be coupled together to form the housing 302. In some embodiments, at least the first housing portion 304 is formed from a ceramic material. In some embodiments, the second housing portion 306 is formed from any material, including polymer, metal, glass, ceramic, and the like.

In some embodiments, the device 300 may be an electronic device configured to provide health-related information or data such as but not limited heart rate data, blood pressure data, temperature data, oxygen level data, diet/nutrition information, medical reminders, health-related tips or information, or other health-related data. Accordingly, the device 300 may include sensors for detecting information from which such health-related information or data may be directly or indirectly determined.

More specifically, in some embodiments, the device 300 includes sensors that detect signals emitted and/or reflected from a user's body. Additionally, the device 300 may include emitters that operate in conjunction with sensors in order to impart a signal (e.g., visible light, infrared/electromagnetic radiation, and the like) onto or into the body of a user. The sensors may then detect how the signal has been affected by the user's body (e.g., an amount of light reflected by the user's skin, electrical signal attenuation caused by the user's skin, and the like).

Such sensors and/or emitters may be housed within the housing 302 of the device. However, the particular material of the housing 302, and in particular, the first housing portion 304 that contacts the user's body, may block, obstruct, or otherwise impede the signals to and from the sensors and/or emitters. For example, where the first housing portion 304 is made from an opaque ceramic material, an optical sensor or emitter will not be able to communicate with the user's skin. Accordingly, the housing 302 (and, more specifically, the first housing portion 304) may include a window 308 through which a sensor and/or emitter may communicate with the body of the user.

FIG. 4A depicts a bottom plan view of the housing 302, showing the window 308 in the first housing portion 304. In some embodiments, as shown in FIG. 4A, a sensor/emitter 400 may be situated inside the housing 302 above and proximate the window 308. The sensor/emitter 400 senses and/or emits signals through the window 308. The sensor/emitter 400 may be a sensor, an emitter, or a combination of a sensor and an emitter. For ease of reference, however, the sensor/emitter 400 is referred to herein simply as a sensor 400. Where the description refers to a sensor detecting signals that enter the housing 302 via the window 308, it will be understood that such description also applies by analogy to emitters emitting signals that travel out from the housing 302 through the window 308.

In some embodiments, the window 308 is formed from an optically transparent material, such as a transparent polymer. However, the window 308 may be formed from any material that has the desired and/or necessary transmittance for the particular signal used by the sensor 400. For example, if an emitter is configured to emit radio waves, the window 308 may be formed from a polymer material that more freely transmits radio waves than the material from which the rest of the first housing portion 304 is formed. As another example, if a sensor is configured to sense visible light, the window 308 may be formed from a polymer material that is transparent or translucent. In some embodiments, the polymer material has a higher electromagnetic transmittance in a particular spectral band than the ceramic material. In some embodiments, the window 308 is a transparent ceramic, crystalline, or glass material, and the first housing portion 304 is a polymer material that is molded around the window 308.

As noted above, the sensor 400 may be used by the device 300 to detect health-related information, such as heart rate data, blood pressure data, temperature data, oxygen level data, blood sugar data, and the like. Accordingly, the window 308 is configured to facilitate the passage of signals between the sensor 400 and the outside of the housing 302. In other embodiments, the window 308 is configured to facilitate the passage of signals for any purpose. For example, the sensor 400 may be an imaging sensor (e.g., for a digital camera), in which case the window 308 may be configured to allow light to pass through the window 308 and onto the imaging sensor. As another example, the sensor/emitter 400 may be an antenna (e.g., for radio communications) that is configured to emit and/or detect electromagnetic signals. Accordingly, the window 308 may be configured to allow radio frequency ("RF") signals to pass through the window 308.

FIG. 4B is a cross-sectional view of the first housing portion 304, taken through line 4B-4B in FIG. 4A. FIG. 4B illustrates the sensor 400 disposed adjacent the window 308 on an interior side of the first housing portion 304. The sensor 400 is disposed such that signals may be sensed and/or emitted from the sensor 400 through the window 308, even though such signals may not be able to be sensed and/or emitted as efficiently (or at all) through the first housing portion 304.

Similar to the description of the retaining component 200, above, the window 308 may be a polymer material that is co-molded with the ceramic first housing portion 304. For example, the window 308 may be molded directly into an opening (e.g., an aperture) in the first housing portion 304. More specifically, as described below, the first housing portion 304 having an aperture extending from an interior side to an exterior side may be formed from a ceramic material, and then placed into a mold. A polymer material may then be injected, poured, or otherwise introduced into the aperture such that the polymer material is bonded to the ceramic material (e.g., the polymer material bonds directly to the ceramic walls of the aperture in the first housing portion 304). When removed from the mold, the window 308 may completely fill the aperture in the first housing portion 304. For example, an interior surface 414 of the window 308 may be substantially coplanar with the interior surface 410 of the first housing portion 304, and the exterior surface 416 of the window may be substantially coplanar with an exterior surface 412 of the first housing portion 304. Alternatively, the window 308 may only partially fill the aperture in the first housing portion 304. For example, one or both of the interior or exterior surfaces of the window 308 may be recessed with respect to the interior or exterior surfaces of the first housing portion 304, respectively.

In some embodiments, the aperture in the first housing portion 304 into which the window 308 is injected is counterbored. More specifically, the aperture may include a first cylindrical portion 404 extending from the interior surface 410 of the first housing portion 304 and terminating at a point between the interior and exterior surfaces of the first housing portion. The aperture further includes a second cylindrical portion 402 having a different diameter than the first cylindrical portion and being coaxial with the first cylindrical portion 404, where the second cylindrical portion 402 extends from the exterior surface 412 of the first housing portion 304 and joins the first cylindrical portion 404 at the point where the first cylindrical portion 404 terminates (e.g., between the interior and exterior surfaces of the first housing portion 304). As shown in FIG. 4B, the first cylindrical portion 404 has a larger diameter than the second cylindrical portion 402.

Co-molding the polymer material into the aperture in the first housing portion 304 may provide advantages over other methods of manufacturing. For example, the part count and assembly steps for the first housing portion 304 (and thus the device 300) may be reduced, as the co-molding process creates a unitary part, and does not require manual assembly of a pre-formed polymer window with a pre-formed ceramic housing component. Co-molding the polymer material directly into the aperture may also eliminate the need for an adhesive to be used to adhere the polymer material to the ceramic material, further reducing manufacturing complexity, time, and cost, and also producing a component that may be more durable and resistant to unintended disassembly.

Moreover, the co-molding process may create a better seal between the window and the housing portion than other methods of manufacturing or assembly. This may be particularly important in the case of wearable electronic devices such as watches and health-monitoring devices that need to be sealed against water or other contaminants, and even more important for components that will be placed against a user's skin. For example, a wearable electronic device that is intended for use during exercise should be sealed to prevent the ingress of sweat and water.

Additionally, it may be difficult to maintain high enough manufacturing tolerances in pre-formed ceramic and polymer components to ensure a good fit between the components. For example, in the case of the window 308 in the first housing portion 304 in FIG. 4B, it may be difficult and/or expensive to manufacture pre-formed polymer windows to the exacting tolerances required to fit into the aperture in the first housing portion 304, as even small deviations in the dimensions of a polymer window and/or the housing portion may lead to gaps or openings between the window and the housing. Similarly, in the case of the retaining component 200 in FIG. 2A, it may be difficult and/or expensive to manufacture a polymer retaining component 200 that fits snugly within the cavity of the first housing portion 104. Additionally, because the polymer material is flowed into the aperture in the co-molding process, dimensional tolerances for the ceramic component may be reduced, as the portions of the ceramic that mate with the polymer need not be as accurate or precise if they do not need to be mated to another rigid component. For example, the tolerances for the diameter, roundness, and/or axial alignment of the aperture may be more relaxed than they would need to be if a pre-formed window were to be installed into the aperture.

In some embodiments, the geometry of the aperture is configured such that the polymer material is mechanically retained to the first housing portion. FIG. 4C is a cross-sectional view of the first housing portion 304, taken through line 4B-4B in FIG. 4A, showing a geometry that mechanically retains the polymer material within the aperture. In particular, the first housing portion 304 includes an aperture having a frusto-conical portion 408 extending from the interior surface 410 of the first housing portion 304 and terminating at a point between the interior and exterior surfaces of the first housing portion. The aperture further includes a cylindrical portion 406 that is coaxial with the frusto-conical portion 408, where the cylindrical portion 406 extends from the exterior surface 412 of the first housing portion 304 and joins the frusto-conical portion 408 at the point where the frusto-conical portion 408 terminates (e.g., between the interior and exterior surfaces of the first housing portion 304).

The diameter of the frusto-conical portion 408 at the opening in the interior surface 410 is smaller than the diameter at the point where the frusto-conical portion 408 joins the cylindrical portion 406. In other words, the frusto-conical portion 408 forms an undercut that prevents the window 308 from being removed from the aperture in a direction toward the interior surface 410. Additionally, the diameter of the frusto-conical portion 408 at the point where the frusto-conical portion 408 joins the cylindrical portion 406 is larger than the diameter of the cylindrical portion. The shoulder that is formed at this region prevents the window 308 from being removed from the aperture in a direction toward the exterior surface 412.

The combination of the angled face of the frusto-conical portion 408 and the shoulder in the interior of the aperture retains the window 308 securely within the aperture, creating a strong, well-sealed housing component. It would be difficult or impossible, however, to implement this or similar geometry when using a rigid, pre-formed window. Because the co-molding process described herein injects liquid polymer into the aperture, which then flows to fill the entire aperture regardless of its interior geometry, complex geometries such as that shown in FIG. 4C are possible. The strength of the resulting housing component and the quality of the window seal may be particularly useful for wearable devices that require high strength for durability during day-to-day use, as well as effective sealing against debris, moisture, sweat, or other contaminants.

Figure 5A:
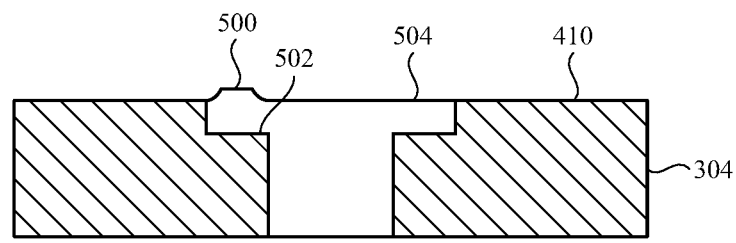
FIGS. 5A-5B depict a cross-sectional view of a first portion of the housing of FIG. 4A, in accordance with some embodiments.
Figure 5B:
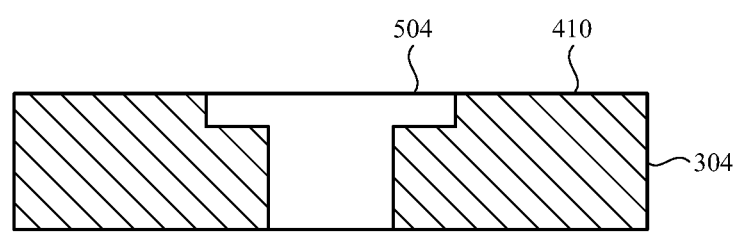

In some embodiments, the co-molding process results in surface imperfections or excess polymer material on the window. FIGS. 5A-5B are cross-sectional views of the first housing portion 304, taken through line 4B-4B in FIG. 4A, illustrating an example of excess polymer material and how it may be processed so as to not interfere with the operation of the window 308 and/or the ability to mount components (e.g., a sensor 400) adjacent the window 308. Specifically, FIG. 5A illustrates a window 308 having a sprue 500 on an interior surface 504 of the window 308. The sprue 500 may be a protrusion of polymer material at the point where an injection nozzle injected polymer material into the aperture in the first housing portion 304.

In some embodiments, an injection molding apparatus may be configured such that the sprue 500 is disposed above a shoulder 502, so that a path through the window 308 is not occluded or otherwise impeded by the excess material. In such cases, the sprue 500 may be left on the window 308.

In some embodiments, the sprue 500 is removed so that the interior surface 504 of the window 308 is co-planar with the interior surface 410 of the first housing portion 304, as shown in FIG. 5B. The sprue 500 may be removed by any appropriate process, including machining, polishing, grinding, milling, laser ablation, and/or cutting. In cases where the sprue 500 is removed, the injection molding apparatus may be configured such that the sprue 500 is positioned in the center of the window 308, above the shoulder 502, or in any other appropriate location.

While the housings and housing components shown and described with reference to FIGS. 3-5B are described as being for watches or other wearable electronic devices, these merely example implementations, and the components described above, as well as the principles of manufacturing (e.g., co-molding ceramic and polymer components) apply to other devices as well. For example, ceramic and polymer materials may be co-molded to produce housing components for smartphones, tablet computers, laptop computers, mechanical watches, or any other appropriate device.

Several examples of polymer features that may be co-molded with a ceramic component are described above. Specifically, FIGS. 2A-2C show a polymer retaining component 200 co-molded to a ceramic housing portion, and FIGS. 3-5B show a polymer window 308 co-molded to an aperture in a ceramic housing portion. Additional polymer features may also be created by co-molding a polymer material with a ceramic component, however. For example, FIGS. 6A-9B depict additional examples of polymer features co-molded with ceramic components.

Figure 6A:
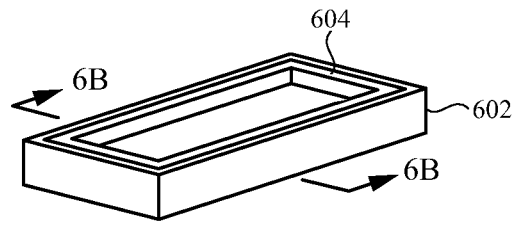
FIGS. 6A-6B depict perspective and cross-sectional views, respectively, of a portion of a housing for an electronic device, in accordance with some embodiments.
Figure 6B:
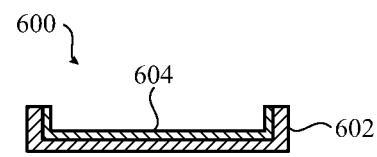

FIGS. 6A-6B depict perspective and cross-sectional views, respectively, of a housing portion 600 for an electronic device. The housing portion 600 includes a ceramic portion 602 and a polymer portion 604. The ceramic portion 602 may be a bottom portion of a housing for an electronic device such as a smartwatch. The ceramic portion 602 is a shell forming a cavity, where the cavity is defined by a central surface surrounded by a flange. The polymer portion 604 is co-molded against the interior surface of the shell (e.g., against the central surface and the flange). In particular, the polymer portion 604 coats the interior surface of the ceramic shell, forming features that extend away from the central surface of the cavity (e.g., the portions that coat the flange of the shell) and a base portion that coats or otherwise contacts the central surface of the cavity. In some embodiments, as shown in FIG. 6B, the polymer portion is of a uniform or substantially uniform thickness. In other embodiments, the thickness of the polymer portion 604 varies across the surface of the polymer portion.

Figure 7A:
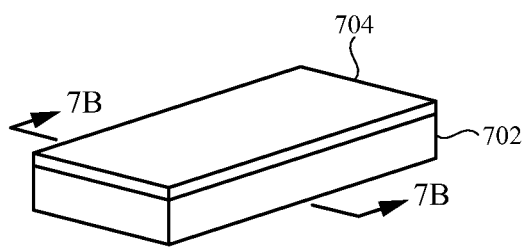
FIGS. 7A-7B depict perspective and cross-sectional views, respectively, of a portion of a housing for an electronic device, in accordance with some embodiments.
Figure 7B:
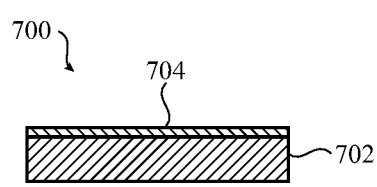

FIGS. 7A-7B depict perspective and cross-sectional views, respectively, of a housing portion 700 for an electronic device. The housing portion 700 includes a ceramic portion 702 and a polymer portion 704. As shown, the polymer portion 704 is coextensive with a surface of the ceramic portion 702, but this need not be the case. For example, the polymer portion 704 may cover only a portion of a surface of the ceramic portion 702. Like the polymer portion 604 in FIGS. 6A-6B, the polymer portion 704 coats a surface of the housing portion 700, and may have a single, continuous thickness, or may have different thicknesses at different locations. Either the ceramic portion 702 or the polymer portion 704 may be used as an external surface of the housing. For example, the ceramic portion 702 may form an interior surface of the housing, and the polymer portion 704 may form an exterior surface of the housing, or vice versa.

In some embodiments, coating a ceramic housing portion as shown and described with respect to FIGS. 6A-7B (as well as FIG. 9B, discussed below) increases the strength and/or toughness of the housing portion. This may also allow the ceramic portions of the housing 600, 700, 900 to be made thinner while maintaining or improving the strength and/or toughness of the overall component. In some cases, ceramic materials can flex a greater amount (before breaking) if the ceramic material is thinner. That is, a thinner component will bend more prior to rupturing when a particular force is applied as compared to a thicker component subjected to the same force. Thus, by reducing the thickness of the ceramic portions of the housing and co-molding a polymer material to the ceramic portion, certain benefits of ceramic materials may be realized in the component (e.g., superior surface finish, hardness, aesthetics, and the like) while also reducing the likelihood that an impact or other force on the component will result in the component breaking. In particular, the increased flexibility of the ceramic material resulting from using a thin layer of ceramic material (e.g., a layer of ceramic material that is thinner than would be practicable in the absence of the polymer material) enables the component to bend a greater amount before breaking, thus making the component more resilient.

Furthermore, because the co-molding process results in a tight bond between the polymer material and the ceramic material, if the ceramic material shatters, cracks, or otherwise breaks, the polymer material may maintain the structural integrity of the housing component, and even hold the broken ceramic pieces together so that they do not cause injury to a user.

Figure 8A:
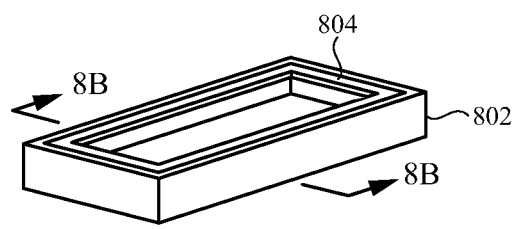
FIGS. 8A-8B depict perspective and cross-sectional views, respectively, of a portion of a housing for an electronic device, in accordance with some embodiments.
Figure 8B:
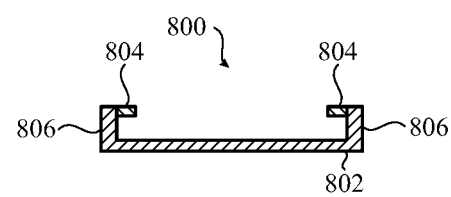

FIGS. 8A-8B depict perspective and cross-sectional views, respectively, of a housing portion 800 for an electronic device. The housing portion 800 includes a ceramic portion 802 and a polymer portion 804. The ceramic portion 802 is a shell forming a cavity, where the cavity is defined by a central surface surrounded by a flange 806. The polymer portion 804 is coupled to the walls 806 by co-molding the polymer portion 804 with the ceramic portion 802. The polymer portion 804 forms an undercut with respect to the walls 806, which may be used, for example, to engage a clip or latch of another housing component.

The undercut formed by the polymer portion 804 is another example of a complex geometry that may be difficult to form from a ceramic material only. In particular, it may be difficult to mold, machine, or otherwise form a ceramic component having an undercut such as that shown in FIG. 8. And even if the geometry were to be formed, the brittleness of the ceramic material (and the stress concentration in corners) may make the undercut too fragile for some uses. Accordingly, co-molding a polymer material with the ceramic portion 802 allows such complex geometries to be manufactured more simply and may produce stronger components than would be possible with ceramic alone.

Figure 9A:
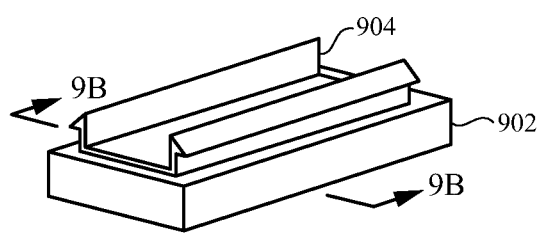
FIGS. 9A-9B depict perspective and cross-sectional views, respectively, of a portion of a housing for an electronic device, in accordance with some embodiments.
Figure 9B:
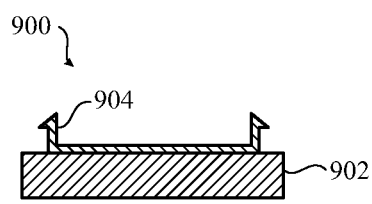

FIGS. 9A-9B depict perspective and cross-sectional views, respectively, of a housing portion 900 for an electronic device. The housing portion 900 includes a ceramic portion 902 and a polymer portion 904. The polymer portion 904 is co-molded with the ceramic portion 902 to couple the polymer portion 904 to the ceramic portion 902. The housing portion 900 is similar to the first housing portion 104 described herein (FIG. 2A-2C), but lacks the walls 216 forming a cavity. The polymer portion 904 is a retaining component, such as the retaining component 200 described herein. In some embodiments, the polymer portion 904 is used to retain the housing portion 900 to another housing component to form a housing for an electronic device. For example, the housing portion 900 may be coupled to the housing portion 800 in FIGS. 8A-8B to enclose an interior volume that may contain electronic device components.

Figure 10:
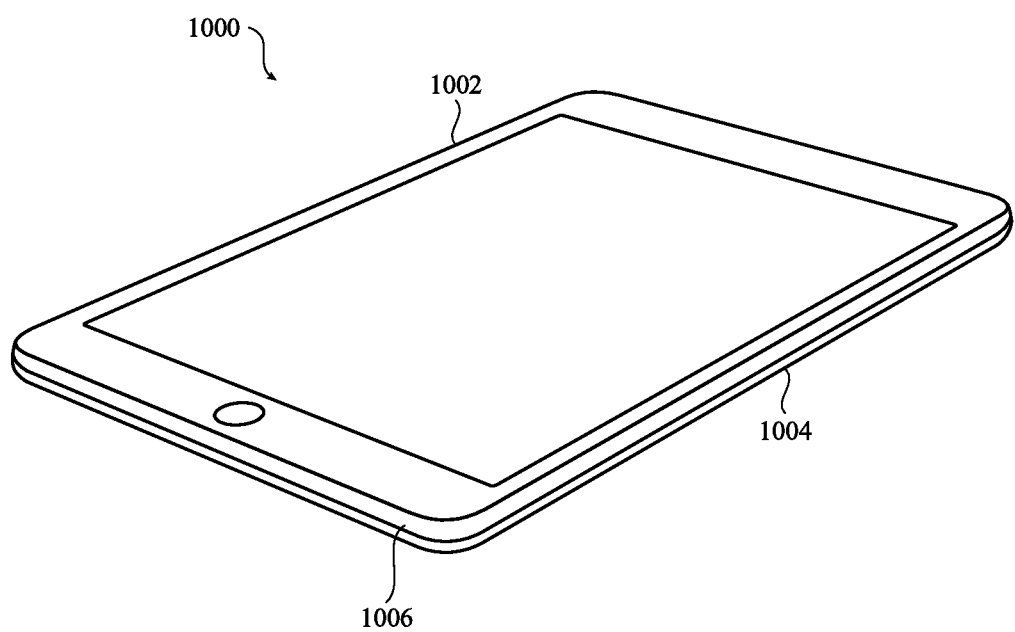
FIG. 10 depicts an illustrative perspective view of an example of an electronic device, in accordance with some embodiments.

Referring now to FIG. 10, there is shown an illustrative perspective view of one example of an electronic device 1000 (also referred to as "device 1000"). In particular, the device 100 represents a tablet computer.

The device 1000 may include a housing 1002. The housing 1002 may form an outer surface or partial outer surface and protective case for the internal components of the device 1000. The housing 1002 may include a first housing portion 1004 and a second housing portion 1006. In some embodiments, the first housing portion 1004 forms a bottom portion of the housing, and the second housing portion 1006 forms a top portion of the housing. In some embodiments, at least the first housing portion 1004 is formed from a ceramic material. In some embodiments, the second housing portion 1006 is formed from any material, including polymer, metal, glass, ceramic, and the like. The first and second housing portions 1004, 1006 may be coupled together to form the housing 1002 using a polymer retaining features such as those shown and described with respect to FIGS. 8A-9B.

Figure 11A:
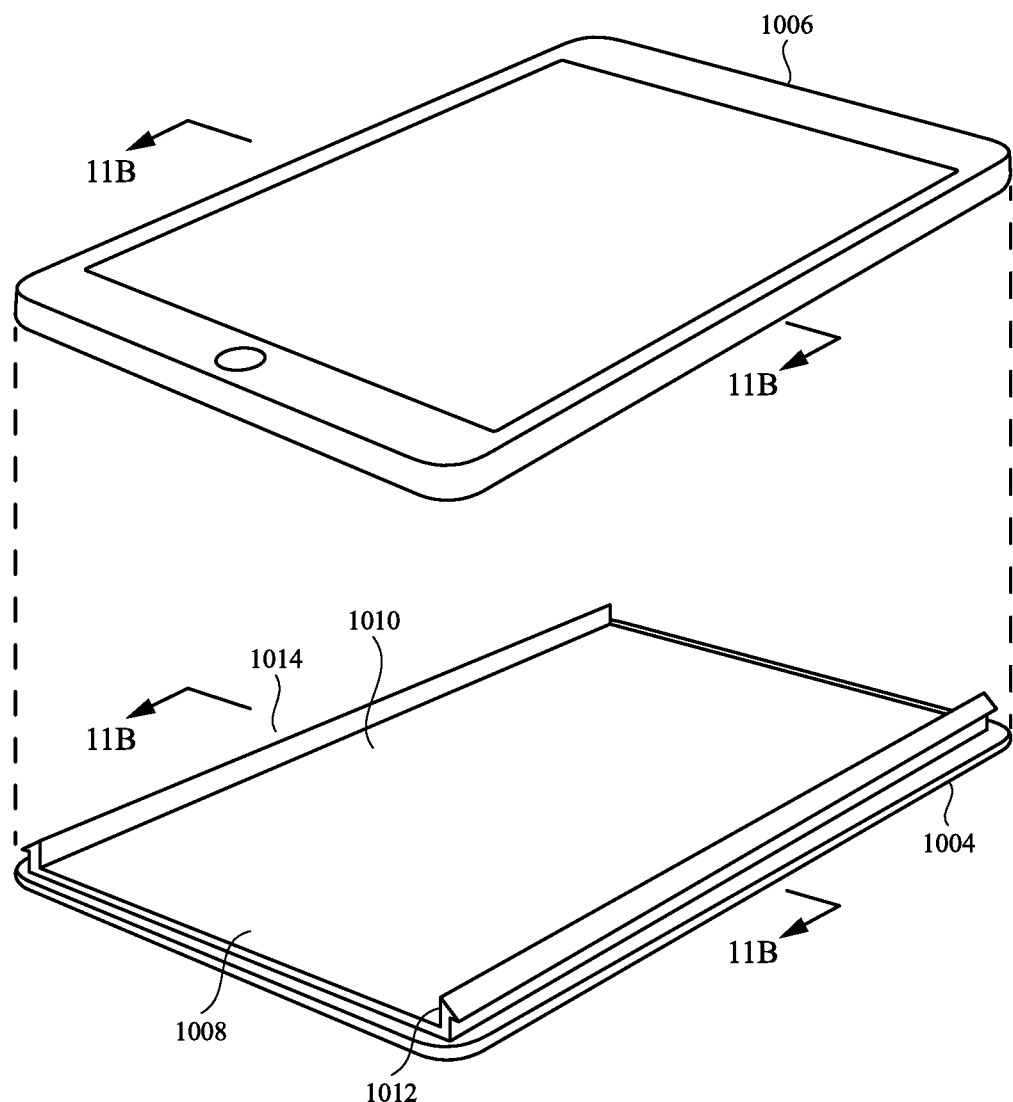
FIG. 11A depicts an exploded perspective view of a housing for an electronic device, in accordance with some embodiments.

FIG. 11A depicts an exploded perspective view of the housing 1002, showing the second portion 1006 separated from the first portion 1004. The first housing portion 1004 includes a polymer retaining component 1008 coupled thereto. As described herein, the polymer retaining component 1008 is coupled to the first housing portion 1004 as a result of the polymer material being co-molded directly onto the first housing portion 1004.

The retaining component 1008 includes a mounting base 1010, as well as a first arm 1012 and a second arm 1014 each extending away from the mounting base 1010. The first and second arms are configured to engage with a retaining feature of the second housing portion 1006 in order to retain the first housing portion 1004 to the second housing portion 1006, as shown in FIG. 11C.

Figure 11B:
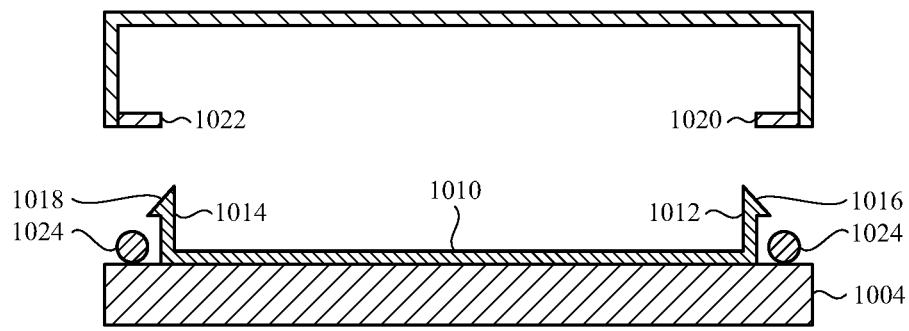
FIGS. 11B-11C depict cross-sectional views of the housing of FIG. 11A, in accordance with some embodiments.
Figure 11C:
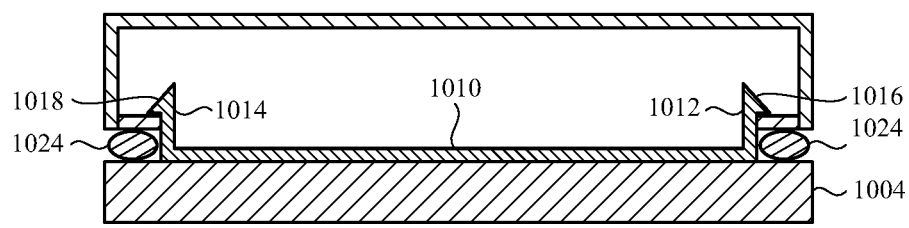

FIGS. 11B and 11C depict cross-sectional views of the housing 1002 taken through line 11B-11B in FIG. 11A. In particular, FIG. 11B shows the first housing portion 1004 separated from the second housing portion 1006, and FIG. 11C shows an assembled housing where the first housing portion 1004 is retained with the second housing portion 1006. In particular, the first and second arms 1012, 1014 include first and second latch elements 1016, 1018, respectively. The latch elements are configured to engage with retaining features 1020, 1022, respectively, of the second housing portion 1006 in order to retain the first and second housing portions 1004, 1006 together. As described with respect to FIGS. 8A-8B, the retaining features 1020 and 1022 may be formed from polymer material that is co-molded with the second housing portion 1006.

In some embodiments, the housing 1002 includes a seal 1024 disposed between the first housing portion 1004 and the second housing portion 1006, as described above.

Various examples of ceramic components having polymer features molded thereto are described above. As noted, co-molding ceramic and polymer to create these components may provide numerous benefits. For example, features and geometries that would be difficult or impossible to produce from ceramic alone can be formed from a polymer material that is molded directly to a ceramic component. Moreover, because polymer materials are co-molded directly to the ceramic component, components having both ceramic and polymer features can be produced while reducing assembly times, lowering part counts, and lowering the manufacturing tolerances necessary for individual parts. Therefore, it is generally beneficial to manufacture components for electronic devices, such as housing components, by co-molding polymer features onto ceramic materials. The manufacturing systems and methods described below may be used to manufacture such parts.

Figure 12:
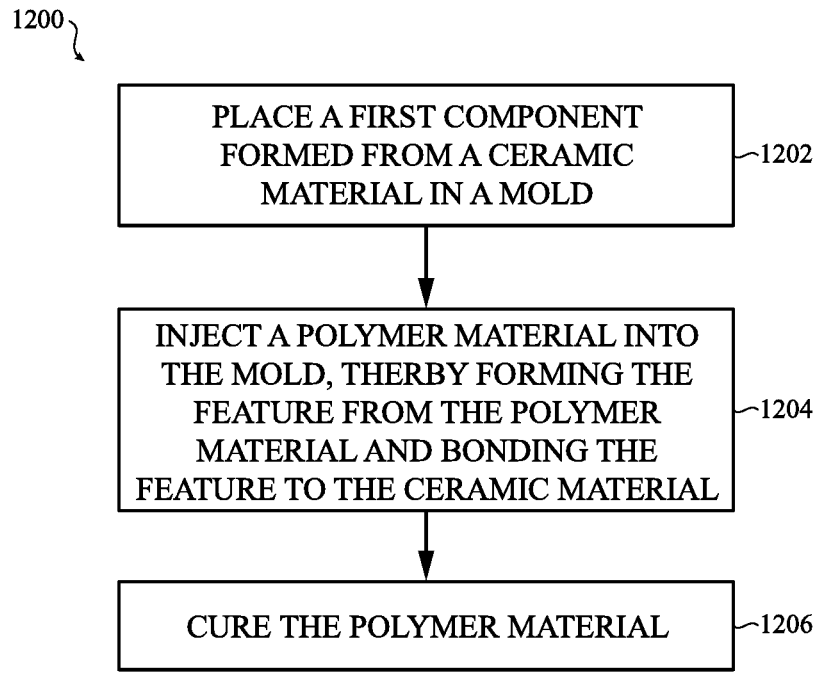
FIG. 12 depicts a method of manufacturing a housing component for an electronic device, in accordance with some embodiments.

FIG. 12 depicts an exemplary method 1200 of manufacturing a housing component for an electronic device. At block 1202, a first component formed from a ceramic material is placed in a mold. The mold includes a first section defining a first cavity configured to receive the first component, and a second section defining a second cavity that is in communication with the first cavity when the mold is closed. The second section may further include one or more sprues through which polymer material may be introduced into the second cavity. The mold may be a two-part mold for use in a polymer injection molding process.

The first cavity may have a shape that is complementary to the first component, such that the first component fits snugly into the first cavity and is evenly supported by the cavity. This way, a ceramic component, which may be brittle and susceptible to breaking if deformed or flexed, may be adequately supported during subsequent molding operations.

The second cavity may be in the shape of a feature that is to be joined to the ceramic material. For example, the second cavity may be in the shape of the retaining component 200 (FIG. 2A), or in the shape of a plate or coating that is to be applied to a surface of the ceramic component (FIGS. 7A-7B). The second cavity may be in the shape of other features as well, including features not described herein.

Alternatively, the roles of the first and second cavities may be reversed. For example, the second cavity may have a shape that is complementary to the first component, such that the first component fits snugly into the second cavity and is evenly supported by the second cavity, and the first cavity may be in the shape of a feature that is to be joined to the ceramic material.

When the mold is closed with the ceramic component in the first cavity (e.g., the first and second sections of the mold are held together), the second cavity may open directly onto a surface of the ceramic component. Thus, polymer material injected into the second cavity will contact and be molded against the ceramic component. Accordingly, polymer material may be introduced between the ceramic material and at least a portion of the second cavity of the mold to create a polymer feature.

At block 1204, a polymer material is injected into the second cavity, thereby forming the feature from the polymer material and bonding the feature to the ceramic material. In some embodiments, the polymer material is a thermoset polymer material. In some embodiments, the polymer material is thermoplastic polymer material. In some embodiments, the polymer material is any combination of these or other types of polymers.

In some embodiments, injecting the polymer material into the second cavity may include injection with or without additional pressure being applied to the polymer material. In particular, the polymer material may be injected into the second cavity using an injection-molding machine (or other process) that pressurizes the polymer material in order to force it into the mold cavity. In other cases, the polymer material may be injected into the second cavity by simply pouring the polymer material into the mold at atmospheric pressure.

The polymer material may be bonded directly to the ceramic material as a result of the molding process and/or curing of the polymer material. Such bonding may occur based on mechanical or chemical adhesion (or any other mechanism of adhesion) between the surface of the ceramic material and the polymer material. For example, the polymer material may mechanically bond to an etched, textured, grooved, machined, or otherwise roughened ceramic surface without the need for interstitial adhesives, glues, or the like. In order to facilitate such bonding, a surface of the first component may be treated to create a roughened surface prior to the first component being placed in the mold. In some embodiments, the surface need not be separately treated to create the roughened surface. Rather, the surface may have a suitable surface finish as a result of the process of manufacturing the ceramic component (e.g., from casting, molding, or any other suitable manufacturing/forming technique).

In some embodiments, the first housing component includes an anchoring cavity and/or an anchoring protrusion that mechanically secures the polymer feature to the first component. An anchoring cavity may be a blind hole, a channel, a groove, or any other shape or geometry into which polymer material can flow. An anchoring protrusion may be a post, a spike, or any other shape or geometry around which a polymer material can flow. Polymer material may be flowed into and/or around an anchoring cavity and/or protrusion when the polymer material is injected at block 1204. Once the polymer material is cured (at block 1206, below), the rigid polymer feature may be anchored to the first housing component due at least in part to the coupling to the anchoring cavity/protrusion.

At block 1206, the polymer material is cured. In some embodiments, curing the polymer material includes cooling the polymer material. The polymer material may be cooled at least partially while the housing component is still in the mold.

Once the polymer material is at least partially cured (e.g., chemically, thermally, or otherwise), the housing component may be removed from the mold. In embodiments where the polymer feature is a retaining feature that is configured to mate with a complementary retaining feature on an additional housing component for the electronic device (e.g., the retaining component 200), after the housing component is removed from the mold, the housing component may be coupled to the additional housing component. Prior to coupling the housing component and the additional housing component, electronic device components may be introduced into an interior volume of one or both housing components so that the electronic device components are retained in the housing when it is assembled.

Figure 13:
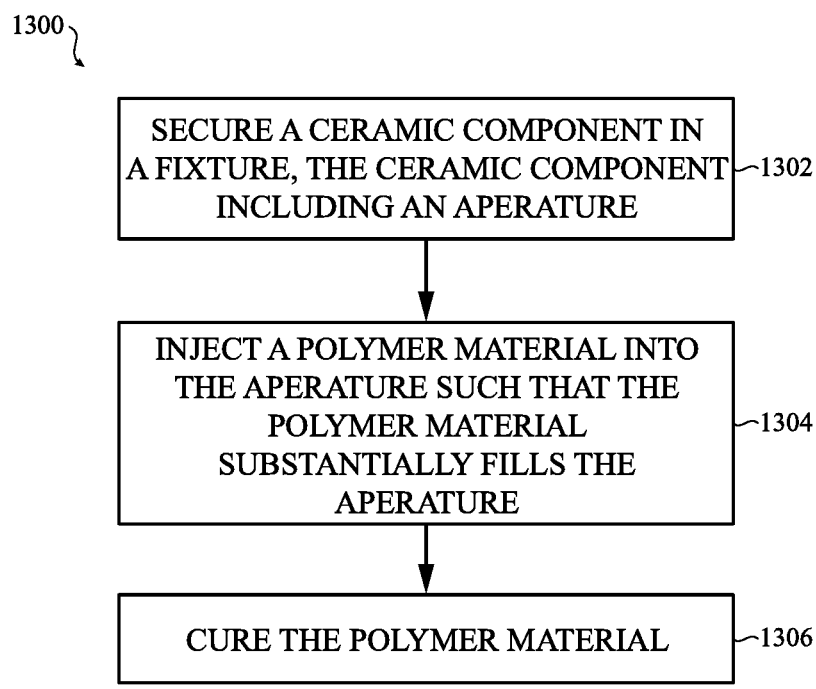
FIG. 13 depicts a method of manufacturing a housing component for an electronic device, in accordance with some embodiments.

FIG. 13 depicts an exemplary method 1300 of manufacturing a housing component for an electronic device. For example, the method 1300 may be used to form a ceramic housing component with a polymer window, such as those described herein with respect to FIGS. 3-5B.

At block 1302, a ceramic component is secured in a fixture. The ceramic component may have a first side and a second side opposite to the first side. The ceramic component may define an aperture extending from the first side to the second side therein. The aperture may be defined by a single cylindrical portion, two coaxial cylindrical portions having different diameters (e.g., a counterbore), or any other shape.

At block 1304, a polymer material is injected (with or without pressurization of the polymer material) into the aperture. As noted above, the polymer material may be a thermoplastic or a thermoset polymer (or any combination of these or other types of polymers). The polymer material may substantially fill the aperture, and such that a first surface of the polymer material is substantially coplanar with the first side of the ceramic component.

At block 1306, the polymer material is cured. In some embodiments, curing the polymer material includes cooling the polymer material. The polymer material may be cooled at least partially while the ceramic component is still secured in the fixture.

In some embodiments, the fixture includes a molding surface. When the ceramic component is secured in the fixture at block 1302, the ceramic component may be placed against the molding surface such that the aperture is enclosed by the molding surface at the first side of the ceramic component. In other words, the molding surface encloses and seals the aperture at one end so that polymer material injected into the aperture from the opposite end is molded against the molding surface. In cases where the molding surface is substantially coplanar with the first side of the ceramic component in the area of the aperture, the window formed by the injected polymer material may likewise be substantially coplanar with the first side of the ceramic component. In other words, the window and the ceramic component form a continuous, smooth surface for the outer surface of the housing.

As noted above with respect to FIGS. 5A-5B, the molding process may leave protrusions, cavities, or other undesirable surface features or blemishes in the polymer window (e.g., the polymer material that was injected into the aperture). For example, a sprue may remain on a surface of the window. Accordingly, in some embodiments, after at least partially curing the polymer material, a sprue is removed from a second surface of the polymer material. The sprue may be removed by any appropriate process, including machining, polishing, grinding, milling, laser ablation, cutting, and the like. In some embodiments, the process used to remove the sprue results in a surface of the window that is substantially coplanar with the second side of the ceramic component. For example, a sprue may be removed by grinding the sprue away, leaving a window surface that is substantially coplanar with the second side of the ceramic component. In this way, both opposing sides of the window may be substantially flat.

In some embodiments, after the polymer material is cured, a sensor and/or an emitter (e.g., the sensor 400) may be mounted on the second side of the ceramic component adjacent the second surface of the polymer material. Example sensors and/or emitters are described herein.

After manufacturing a housing component by co-molding a polymer material with a ceramic material (e.g., as described with respect to methods 1200 and 1300), it may be determined that the polymer portion was not formed correctly, is defective, is not within desired tolerances, or is otherwise unusable or undesirable. Such a determination may be made as the result of an inspection, either by a machine, a human, or a combination of a human and a machine.

If such a determination is made, the polymer material may be removed from the ceramic material such that the ceramic material can be co-molded with a polymer material once again. Because of the properties of some ceramic materials (e.g., high melting point and hardness), the polymer material may be removed in a variety of ways. For example, in some embodiments, the housing component is heated (e.g., in a furnace, or with any other appropriate heating means) such that the polymer material melts, burns, vaporizes, or is otherwise removed from the ceramic material. As another example, in some embodiments, a laser is directed onto the housing component to melt or otherwise ablate the polymer material. As yet another example, a water jet may be used to remove the polymer material by directing a high-pressure water stream onto the polymer material. In each of the foregoing cases, the polymer material may be removed without damaging the ceramic material (or without damaging the ceramic material to such an extent that it cannot be subject to at least one more attempt at co-molding with the polymer material). In some embodiments, after removing the polymer material from the ceramic material, the ceramic material is subjected to one or more of method 1200, method 1300, or any appropriate combination of processing steps discussed herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A housing for an electronic device, comprising:
    a shell formed from a ceramic material and comprising:
        a back wall; and
        a side wall at least partially surrounding the back wall; and
    a polymer material attached to at least part of the back wall and at least part of the side wall and bonded to the ceramic material by mechanical interaction between the polymer material and microstructures of the ceramic material.

2. The housing of claim 1, wherein:
    the back wall defines a first interior surface of the shell and a first exterior surface of the shell; and
    the side wall defines a second interior surface of the shell and a second exterior surface of the shell.

3. The housing of claim 2, wherein the polymer material covers substantially all of the first interior surface of the shell.

4. The housing of claim 3, wherein the polymer material covers substantially all of the second interior surface of the shell.

5. The housing of claim 1, wherein the shell is a unitary ceramic structure.

6. The housing of claim 1, wherein the polymer material is co-molded with the shell.

7. The housing of claim 1, wherein the side wall and the back wall define a cavity configured to receive electronic components therein.

8. An electronic device, comprising:
    a housing component formed of a ceramic material and comprising:
        a wall defining:
            a first portion of an exterior surface of the housing component; and
            a portion of an interior cavity of the housing component; and
            a through-hole extending through the wall from the exterior surface to the interior cavity; and
            a polymer material within the through-hole and defining a second portion of the exterior surface of the housing; and
    a sensor adjacent to a surface of the polymer material.

9. The electronic device of claim 8, wherein the wall comprises a back wall of the housing component.

10. The electronic device of claim 8, wherein the polymer material comprises a machined surface.

11. The electronic device of claim 8, wherein:
    the portion of the interior cavity is a first portion of the interior cavity; and
    the polymer material defines a second portion of the interior cavity.

12. The electronic device of claim 8, further comprising a strap coupled to the housing component and configured to attach the electronic device to a wearer.

13. The electronic device of claim 8, wherein the polymer material is transparent.

14. An electronic device, comprising:
    a display;
    a first housing portion formed from a ceramic material and defining:
        at least part of an exterior surface of the electronic device; and
        a cavity configured to receive electronic components therein;
    a protruding polymer structure free of ceramic material mechanically engaged to and extending away from the ceramic material within the cavity; and
    a second housing portion including a transparent cover positioned over the display, the second housing portion attached to the protruding polymer structure.

15. The electronic device of claim 14, wherein:
    the protruding polymer structure comprises a latch; and
    the second housing portion comprises an engagement feature mechanically engaged with the latch.

16. The electronic device of claim 14, further comprising a seal between the first housing portion and the second housing portion.

17. The electronic device of claim 14, wherein the polymer structure protrudes into the cavity.

18. The electronic device of claim 14, wherein the ceramic material comprises zirconia.

19. The electronic device of claim 14, wherein the electronic device comprises a touch-sensitive input device over the display.

20. An electronic device, comprising:
    a housing component formed of a ceramic material and comprising:
        a wall defining:
            a first portion of an exterior surface of the housing component;
            a portion of an interior cavity of the housing component;
            a through-hole extending through the wall from the exterior surface to the interior cavity;
            a polymer material within the through-hole defining a second portion of the exterior surface of the housing; and
    a sensor adjacent to a surface of the polymer material.

21. An electronic device, comprising:
    a housing component formed of a ceramic material and comprising:
        a wall defining:
            a first portion of an exterior surface of the housing component;
            a portion of an interior cavity of the housing component;
            a through-hole extending through the wall from the exterior surface to the interior cavity;
            a polymer material within the through-hole defining a second portion of the exterior surface of the housing; and
    a strap coupled to the housing component configured to attach the electronic device to a wearer.

22. An electronic device, comprising:
    a display;
    a first housing portion formed from a ceramic material comprising zirconia defining at least part of an exterior surface of the electronic device and a cavity configured to receive electronic components;
    a polymer structure mechanically engaged to the ceramic material within the cavity; and a second housing portion including a transparent cover positioned over the display, the second housing portion attached to the polymer structure.

\* \* \* \* \*